United States Patent
Vobian et al.

(10) Patent No.: US 6,924,890 B1
(45) Date of Patent: Aug. 2, 2005

(54) MEASURING METHOD FOR INDIVIDUAL FIBERS OF CABLES

(75) Inventors: Joachim Vobian, Muehltal (DE); Georg Herchenroeder, Darmstadt (DE); Klaus Moerl, Jena (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/623,125

(22) PCT Filed: Feb. 1, 1999

(86) PCT No.: PCT/EP99/00630

§ 371 (c)(1),
(2), (4) Date: Aug. 25, 2000

(87) PCT Pub. No.: WO99/44027

PCT Pub. Date: Sep. 2, 1999

(30) Foreign Application Priority Data

Feb. 28, 1998 (DE) ........................... 198 08 601

(51) Int. Cl.$^7$ ............................................. G01N 21/00
(52) U.S. Cl. ........................................ 356/73; 356/73.1
(58) Field of Search .................................... 356/73, 73.1

(56) References Cited

U.S. PATENT DOCUMENTS

| | | | |
|---|---|---|---|
| 4,289,398 A | | 9/1981 | Robichaud |
| 4,576,452 A | * | 3/1986 | Abel et al. ................... 359/858 |
| 4,634,274 A | * | 1/1987 | Shen et al. ................. 356/73.1 |

(Continued)

FOREIGN PATENT DOCUMENTS

| EP | 0 548 935 | 6/1993 |
|---|---|---|
| EP | 0 619 657 | 10/1994 |
| JP | 58 100733 | 6/1983 |

OTHER PUBLICATIONS

H. Gruhl et al., "Characterization of 11000 km of installed standard monomode fibre and statustical analysis in view of network design," Core and ATM Networks NOC '97', pp. 59–64.

J. Vobian, "PMD Measurements in the time and frequency domains on Telecom links within the framework of the ACTS projects 'Upgrade'and 'Photon'", Proc. OFMC 97, Teddington (1997).

J. Vobian, "Long–Distance Field Measurements of Spectral Chromatic Dispersion," J. Opt. Commun., Dec. 1985, vol. 6, No. 4, pp. 137–141.

*Primary Examiner*—Tarifur R. Chowdhury
*Assistant Examiner*—Richard Kim
(74) *Attorney, Agent, or Firm*—Kenyon & Kenyon

(57) ABSTRACT

In a method for measuring relevant parameters of individual fibers of single-mode and multimode fibers of glass- or plastic-fiber cables, measuring radiation is reflected at the end of the test fiber to the fiber input by a mirror, particularly a Schmidt mirror having very high reflectivity (>99%), the measurement being carried out at the coupling-in site by a combined transmitting and receiving device. The Schmidt mirror is connected to the test fiber via a so-called fiber connector. The highly reflective mirror coating is applied to the end face of a given connector, so that the Schmidt connector provided with the mirror coating is connected to the test fiber either directly or via a short glass-fiber cable piece terminated with a standard connector and with the Schmidt mirror connector. With the use of a glass-fiber cable piece thus terminated the Schmidt mirror connector remains untouched and is protected.

14 Claims, 6 Drawing Sheets

U.S. PATENT DOCUMENTS

| | | | | |
|---|---|---|---|---|
| 4,737,026 A | * | 4/1988 | Dalgoutte et al. | 356/73.1 |
| 4,838,690 A | * | 6/1989 | Buckland et al. | 356/73.1 |
| 4,883,954 A | * | 11/1989 | Esser et al. | 250/227.12 |
| 5,130,535 A | * | 7/1992 | Kummer et al. | 250/227.16 |
| 5,189,483 A | * | 2/1993 | Inagaki | 208/28 |
| 5,251,001 A | * | 10/1993 | Dave et al. | 250/227.11 |
| 5,319,483 A | * | 6/1994 | Krasinski et al. | 359/113 |
| 5,347,601 A | * | 9/1994 | Ade et al. | 359/152 |
| 5,689,331 A | * | 11/1997 | Staver | 356/123 |
| 5,735,927 A | * | 4/1998 | Sanghera et al. | 65/36 |
| 5,825,479 A | * | 10/1998 | Thompson et al. | 356/73.1 |
| 5,956,131 A | * | 9/1999 | Mamyshev et al. | 356/73.1 |
| 6,080,148 A | * | 6/2000 | Damasco et al. | 606/10 |
| 6,233,100 B1 | * | 5/2001 | Chen et al. | 250/214 VT |
| 6,271,922 B1 | * | 8/2001 | Bulow et al. | 356/477 |
| 6,400,450 B1 | * | 6/2002 | Golowich et al. | 417/473 |
| 6,415,076 B1 | * | 7/2002 | DeCusatis | 385/28 |

\* cited by examiner

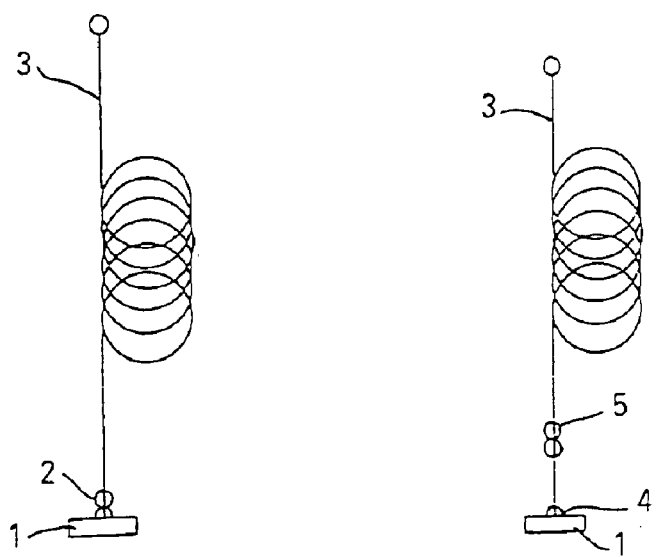
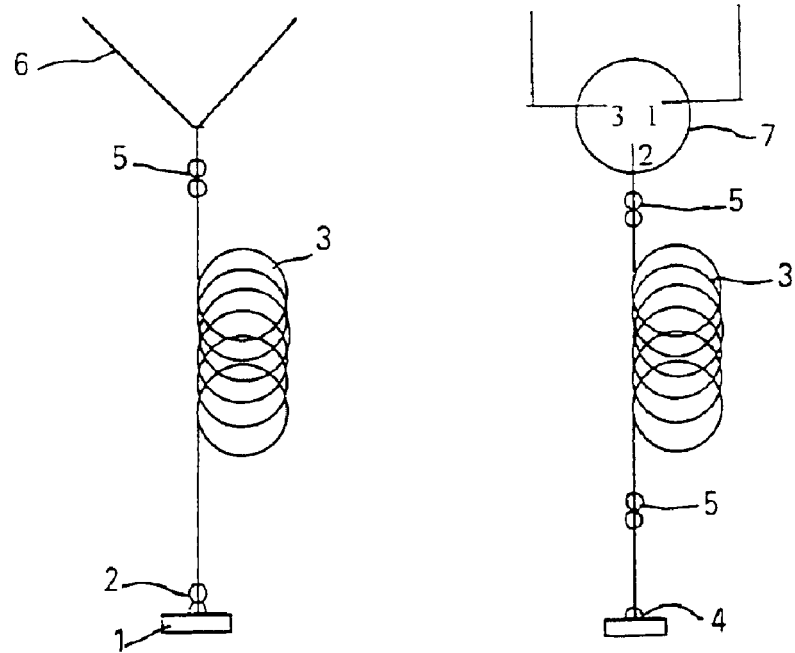
FIG. 1
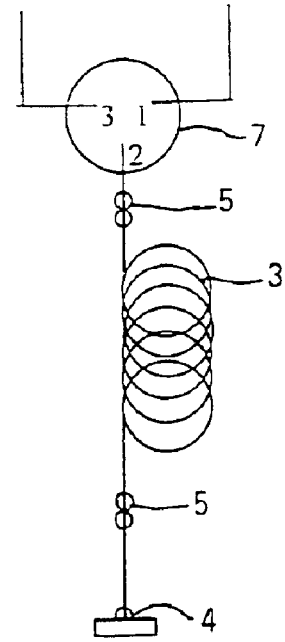
FIG. 2    FIG. 3

MEASURING METHOD FOR INDIVIDUAL FIBERS OF CABLES

FIELD OF THE INVENTION

The invention relates to a method for measuring relevant parameters of individual fibers of glass-fiber or plastic-fiber cables, especially single-mode and multimode fibers, using a transmitting and receiving station.

RELATED TECHNOLOGY

Optical links, especially glass-fiber cables for the connection of sources and sinks, are basically known and are used on a large scale in the fields of telecommunications and data transmission. They are also employed for building cabling in the form of cables having two and more optical waveguides for the purpose of data and information transmission, as well as for the transmission of images and speech. A fundamental problem with regard to field measurements on installed glass-fiber cables is the measuring of individual fibers. Generally, when working with the previously known measuring methods, the transmitter and the receiver must be spatially separated, namely, one device at the one end and the other device at the other end of the glass fiber. To ensure the perfect functioning of the glass-fiber cable, it is essential that the fibers be measured individually in order to determine their specific characteristics and parameters. Thus, it is not permissible to return to the starting point with the aid of a loop composed of two connected fibers, namely one fiber out and one fiber back. On the other hand, the required spatial separation, for example up to 50 km in telephone networks, is time- and cost-intensive, or is not possible at all. As a matter of priority, two main parameters of single-mode fibers (SM fibers) must be measured. These are the attenuation and the transmission bandwidth. The measurement of the attenuation is unproblematic and can be performed accurately in very simple manner from one side of the link using an Optical Time Domain Reflectometer (OTDR). However, in the case of bandwidth measurements, it is necessary to have access to both ends of the cable. Two effects determine the bandwidth in the case of ultrahigh-bit-rate transmission systems, namely the Chromatic Dispersion (CD) and the Polarization Mode Dispersion (PMD). Particularly for PMD measurements, loop measurements are worthless, since the PMD values of the individual fibers of a cable may differ very greatly. The differences can be up to a factor>30.

In this regard, reference is made to the article by H. Gruhl, G. Herchenröder, A. Mattheus, J. Vobian: "Characterization of 11000 km of installed standard monomode fiber and statistical analysis in the view of network design", Proc. NOC '97', Core and ATM Network, Antwerp (1997), p. 59, as well as to the article by J. Vobian, K. Mörl: "PMD measurements in the time and frequency domains on Telecom links within the framework of the ACTS projects "UPGRADE" and "PHOTON", Proc. OFMC 97, Teddington (1997).

Furthermore, the PMD values of the individual fibers do not add up in linear manner (square-root length dependence). The problem of the required separation of transmitter and receiver is further complicated by the fact that various measuring methods either cannot be used at all in this case, such as the Jones Matrix Method for PMD measurements in the frequency domain, i.e. using the polarimeter, or that only unsatisfactory design approaches and/or devices necessary for this purpose, are known, as described in the J. Vobian, K. Mörl article cited above. Generally, the synchronization of transmitter and receiver is problematic or costly in the case of separate measurements in the frequency domain. CD measurements using the phase-shift method require a second fiber for the synchronization pulse. This represents a major restriction in practice. Even with the field measuring station according to the group delay principle described in J. Vobian, G. Herchenröder, E. Unterseher: "Long-Distance Field Measurements of Spectral Chromatic Dispersion", J. Opt. Commun. 6 (1985) 4, 137, it is necessary to employ a trick which results in 3 dB losses. The detector signals of the incoming light pulses are divided with the aid of a delay line and are used as trigger pulses and, with time delay, as measuring signals (quasi-internal triggering). Since both the CD and the PMD measurements are by no means trivial, it is necessary—above all for evaluating the results obtained—to use highly qualified personnel at both ends of the link, which is very cost-intensive.

In Patent Abstracts of Japan, vol. 007, no. 206 (P-222), Sep. 10, 1983, merely an attenuation transmission measurement is described, using a method, which is already repeated by the OTDR principle.

It is not suited for dispersion, bandwidth and PMD measurements, which are completely different than attenuation transmission measurements, since substantially more demanding and more complicated fiber parameters are involved. Moreover, the reflector at the fiber end, in accordance with the above mentioned Patent Abstracts of Japan, is a completely normal reflector and not suited for measurements of complicated fiber parameters.

Likewise, in accordance with European Patent Document No. EP 0 548 935 A1, only one other fiber parameter is measured, the effective refractive index (group index $n_G$). Of necessity, as shown in FIGS. 1 and 5 therein, besides the test fiber, there is a connection between the transmitter and receiver, between blocks 1 and 4, with block 7, i.e., a computing unit is linked to the source for controlling the variation in wavelength. In the block diagrams in accordance with FIGS. 2 through 4 the natural Fresnel reflection (approx. 4%) of the fiber end face is used, as in the case of known OTDR measurements, however, this is far from being sufficient for the required measurements.

SUMMARY OF THE INVENTION

Therefore, an object of the present invention is to provide a measuring method for measuring relevant parameters of individual fibers, especially single-mode and multimode fibers of glass-fiber cables or plastic-fiber cables, the method allowing accurate measurement of the relevant parameters from just one end of the glass or plastic fiber, so that the measurement results obtained can also be evaluated and assessed at just one end of the fiber of the glass-fiber or plastic-fiber cable by, for example, highly qualified personnel. The example presented below is directed to fibers based on quartz glass and, spectrally, to the range between 1200 nm and 1650 nm with the two optical windows around 1300 nm and 1550 nm. The optical components used in experiments, such as couplers and circulators, are likewise designed only for this spectral range. However, this does not constitute a restriction of the measuring method according to the present invention, which can also be applied to plastic fibers with a working range between 650 nm and 950 nm and to meter-component, fluoride-glass fibers.

The present invention provides a method for measuring at least one parameter of an individual fiber of a fiber cable, the method including reflecting measuring radiation at the end of a test fiber to a fiber input using a mirror having at least 99% reflectivity and measuring the at least one parameter using a combined transmitting and receiving station disposed at the fiber input.

A spatial separation of the transmitting and receiving stations of the measuring system is no longer required, because the measuring radiation is reflected at the end of the test fiber to the fiber input by a mirror, hereinafter referred to as a Schmidt mirror, having very high reflectivity (>99%), it being possible to measure the desired fiber parameter at the coupling-in, or injection, site. Furthermore, for the first time in practice, highly specialized personnel are able to evaluate the measuring results at only one end of the respective cable or fiber under test. In addition to the fact that there is no longer any need for the time- and cost-intensive spatial separation of transmitter and receiver, or the required personnel associated with it, it is also possible for the measurement results to be evaluated with considerably greater accuracy and speed. The arrangement has low susceptibility to faults owing to the fact that the highly reflective mirror coating can be applied to the end face of any fiber connector, so that the connector provided with the mirror coating is connected either directly or via a short glass-fiber or plastic-fiber cable piece terminated with a standard connector and with the mirror connector. The use of a glass-fiber cable piece thus prepared has the advantage that the mirror connector remains untouched and is treated with care. The reflected measuring radiation can be coupled out at the input end using a Y-coupler and supplied to the measuring method. Furthermore, instead of the Y-coupler, it is possible to employ in each of the two optical windows a circulator which has a considerably smaller insertion attenuation compared to the Y-coupler. In addition, the measuring method according to the present invention makes it possible to use just one circulator for both optical windows, i.e., in the entire spectral range of interest, this resulting in a slightly higher insertion attenuation. The measuring method according to the present invention includes the advantage that it can be used for measuring the chromatic dispersion, polarization mode dispersion and bandwidth of multimode glass and plastic fibers. Moreover, the method can be employed for high-precision attenuation measurements with cutback technique on installed glass-fiber or plastic-fiber cables, or in cases where, for laboratory measurements, both glass-fiber ends are in separate rooms.

BRIEF DESCRIPTION OF THE DRAWINGS

Hereinbelow, the present invention is described in greater detail with reference to the drawings, in which:

FIG. 1 shows a schematic diagram of two arrangements for demonstrating a measuring principle of a method for measuring relevant parameters of individual fibers of cables;

FIG. 2 shows a schematic diagram of a Schmidt mirror connector connected to the test fiber and to a Y-coupler;

FIG. 3 shows a schematic diagram of a Schmidt mirror connector connected to the test fiber and to a circulator;

DETAILED DESCRIPTION

Figure 4:
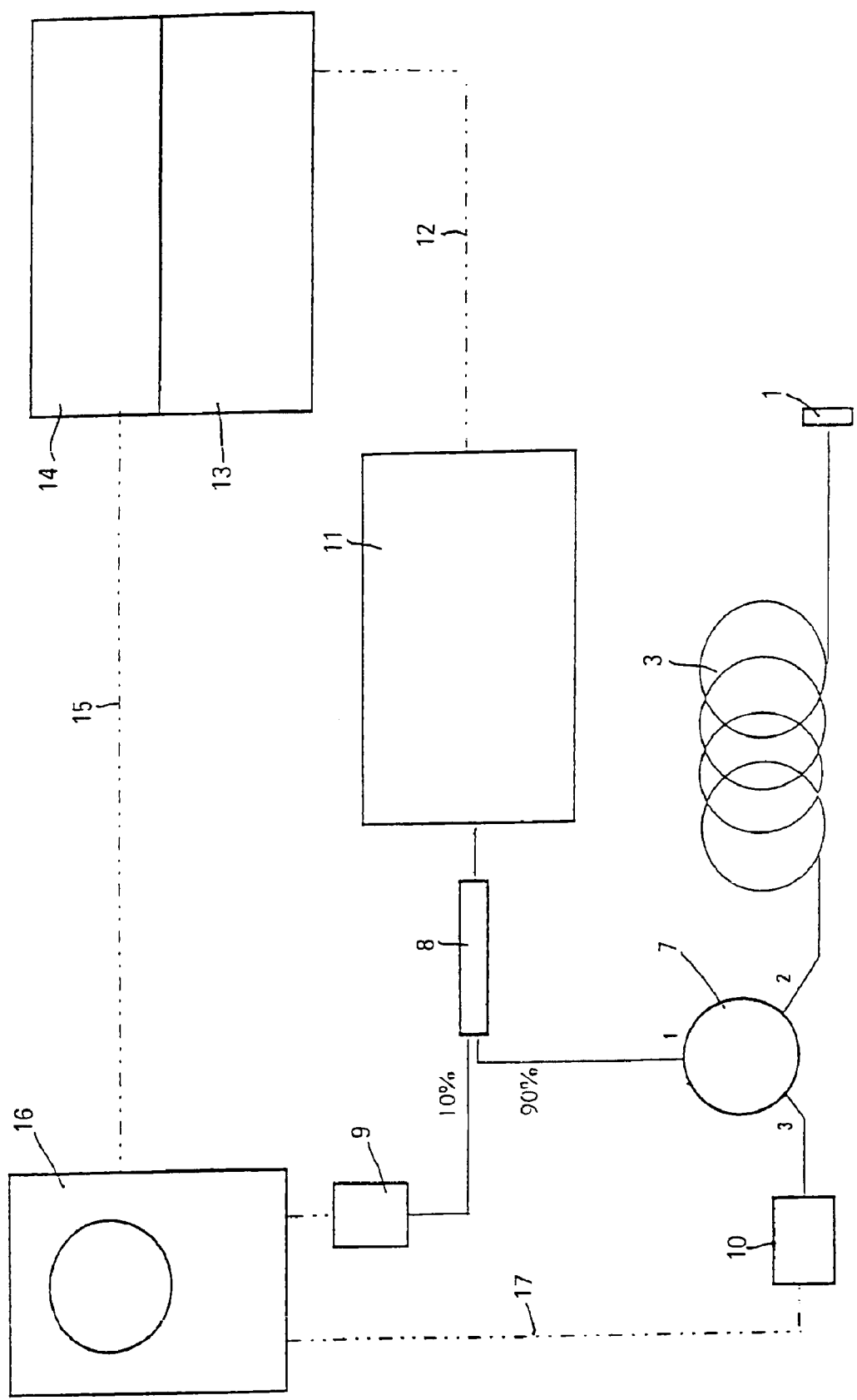
FIG. 4 shows a schematic diagram of a basic setup for measuring chromatic dispersion with a Schmidt mirror (absolute group delay time measurement)

FIG. 1 demonstrates the measuring principle of a method for measuring relevant parameters of individual fibers of a cable according to the present invention. On the left side, a Schmidt mirror 1 on a fiber connector 2 is connected directly to a test fiber 3, and shown in the right-hand diagram is a glass-fiber cable piece, terminated with a Schmidt mirror connector 4 and a standard connector 5 which is connected to test fiber 3. It is known, for example, from H. Döring, J. Peupelmann, F. Wenzel: "$Pr^{3+}$-doped fiber laser using direct coated dichroic mirrors", Electr. Lett. Vol. 31 (1995), No. 13, p. 1068, which is hereby incorporated by reference herein, that it is possible to apply mirrors and filters of various kinds as dielectric coating systems to the end faces of fiber connectors. In the present example, a highly reflective mirror having a reflectivity>99.8% in the spectral range between 1200 and 1650 nm under consideration is applied to the end face of a fiber connector, and this connector thus prepared—as already mentioned, referred to as a Schmidt mirror 1—is connected to standard connector 5 at the remote end of fiber 3. Although the mirror coatings are exceptionally stable mechanically, it is safer, however, to use a short glass-fiber cable piece (a few centimeters long, for example) having two connectors, the one connector being provided with the mirror coating. Second connector 5 is then used for the plug-in connection to test fiber 3. The measuring radiation is reflected at Schmidt mirror 1 and is returned in test fiber 3 to the starting point. Consequently, the measuring radiation passes through test fiber 3 twice, i.e., the distance is 2 L. The objective of separating the reflected light from the input radiation is achieved here by either, according to FIG. 2, using a spectrally broadband Y-coupler 6 or, according to FIG. 3, by using a circulator 7 having ports 1–3. It is also possible as a variant to dispose two circulators 7 in the two optical windows around 1300 and 1550 nm. Broadband Y-coupler 7 is inexpensive and commonly available in optical laboratories. Only one single coupler is required for the entire spectral range of interest. The insertion losses of approximately 6 dB are disadvantageous. On the other hand, the insertion losses of circulator 7 in the specified operating range are very small (<0.6 dB). However, if only one circulator 7 is used for both optical windows, then the losses in both marginal regions of the spectrum are somewhat higher ($\leq 0.8$ dB). In principle, one circulator 7 can be used between 1250 nm and 1620 nm, this having been verified and established in experiments.

The reliability of the measuring method according to the present invention is now documented and described with reference to examples. Described first is the measurement of the chromatic dispersion with reference to FIGS. 4 and 5 which show two alternative measuring setups.

In FIG. 4, the absolute group delay time is measured as a function of the wavelength, i.e., the field measuring station 11 has, for example, eight switchable lasers with eight different waves. The lasers with a wavelength $\lambda = 1193.5$ nm to 1622 nm are controlled and modulated with a pulse generator 13 via a line 12. A coupler 8, particularly a Y-coupler, with a coupling ratio of, for example, 0.1 to 0.9, conducts the 10% light pulse via a detector 9 directly to the one input of an oscillograph 16, in order to define the zero point. The 90% light pulse is supplied to port 1 of circulator 7, and port 2 of circulator 7 is connected to test fiber 3 which is connected at an end to a Schmidt mirror 1. The reflected light is supplied via port 3 to a detector 10 and the detector signal is supplied to the other input of oscillograph 16 via a line 17. The trigger pulse of oscillograph 16 is delayed by a variable electric delay line 14, such that the measuring pulse appears stable on the monitor. Delay line 14 is connected via a line 15 to oscillograph 16 for this purpose. The position of the pulse peak is measured and used as the measured value.

Figure 5:
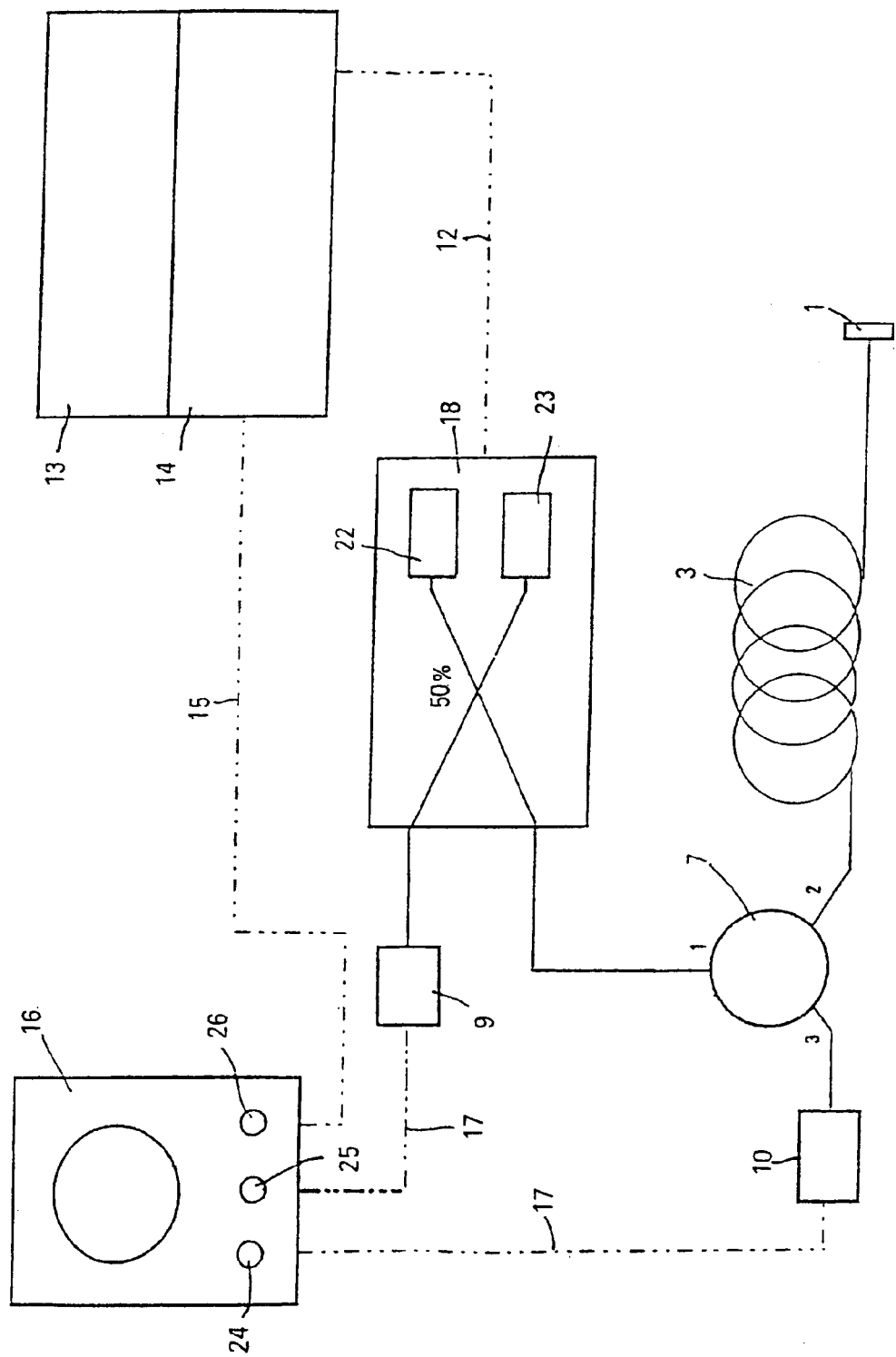
FIG. 5 shows a schematic diagram of a setup for measuring chromatic dispersion with a Schmidt mirror (relative group delay time measurement)

FIG. 5 presents a setup which measures the relative group delay time. Reference laser 22 and variable laser 23 are coupled simultaneously via an X-coupler 18 into port 1 of a circulator 7 or alternatively into one leg of a Y-coupler (not shown). As in FIG. 4, described above, port 2 of circulator 7 is connected to test fiber 3, which is connected at an end to Schmidt mirror 1. The reflected light is supplied via port 3 to a detector 10 and the detector signal is supplied to input 24 (input I) of oscillograph 16 via a line 17. The trigger pulse of oscillograph 16 is delayed by a variable electric delay line 14, such that the measuring pulse appears stable on the monitor. Delay line 14 is connected via a line 15 to trigger input 26 of oscillograph 16 for this purpose. The position of the pulse peak is measured and used as the measured value. The fourth leg of X-coupler 18 delivers the output signals of the transmission measuring station which are supplied via detector 9 and line 27 to input 25 (input II) of the oscillograph 16 (double pulses of the two lasers which are superimposed on the screen of oscillograph 16 in order to guarantee the same starting time). The initially mentioned quasi-internal triggering is omitted, thus saving 3 dB light power previously required as trigger power.

The efficiency of the measuring method according to the present invention is demonstrated with reference to two measuring examples. Table 1 (top part) compiles the measurement results of the single and double fiber lengths of a depressed-cladding fiber from Philips (L=12.6 km). Evaluation (fit function) is carried out with the Legendre orthogonal polynomial of the fourth degree. The bottom part of the table relates to a dispersion-shifted fiber from AT&T with a length of 5.2 km, and evaluation is carried out with a 5-term Sellmeier fit. It should be noted that the evaluation of the dispersion measurements in Table 1 was carried out on two fibers with single and double fiber length with Schmidt mirror. As is apparent from the table, the agreement is perfect, i.e. the zero dispersion wavelengths $\lambda_0$ differ from each other by less than 0.1%. For comparison, in the case of the AT&T DS fiber, the results of very precise measurements with a "Tunable External Cavity laser (TEC laser)" have been included in Table 1.

Figure 6:
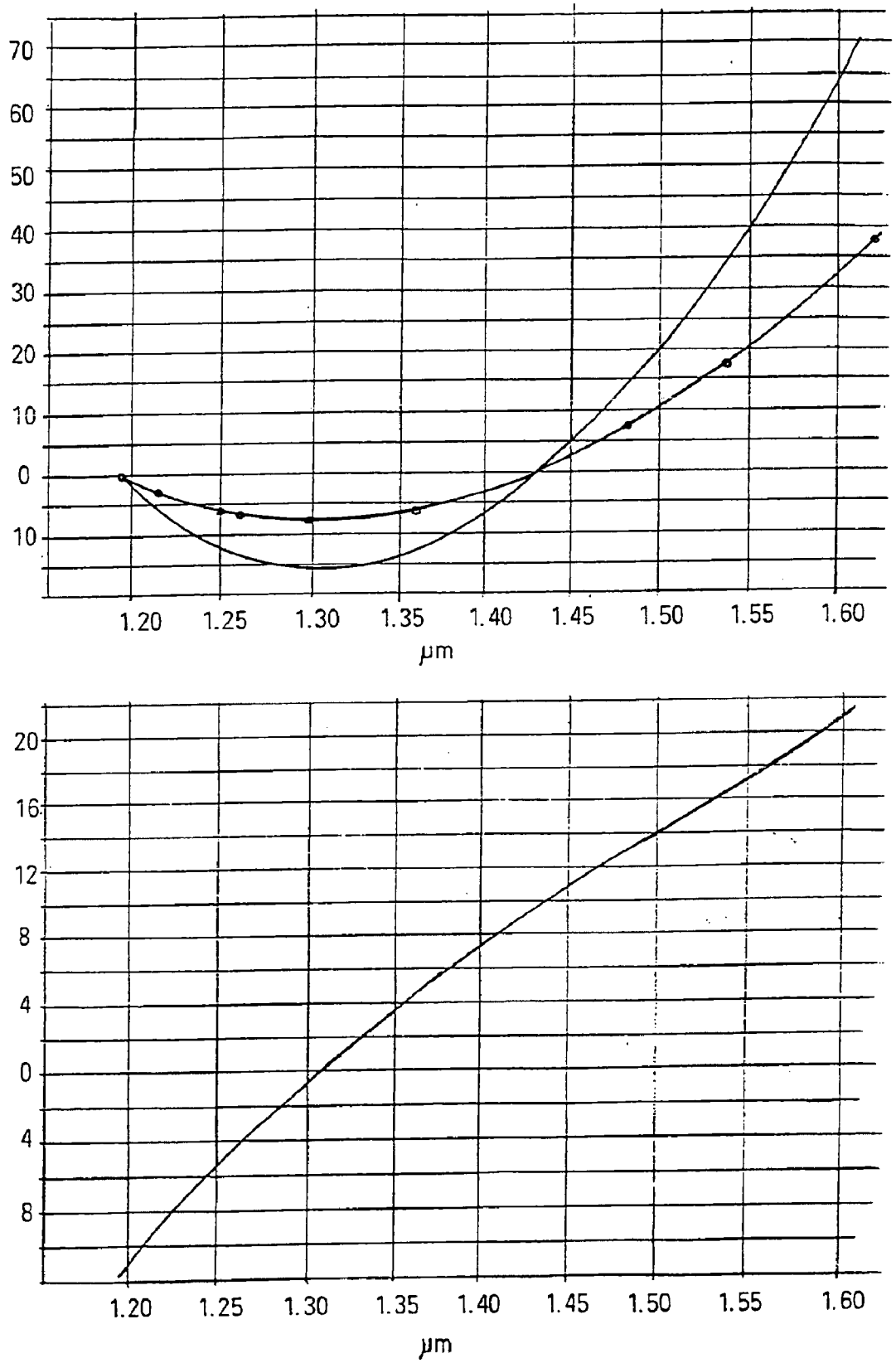
FIG. 6 shows graphs of group delay time curves (top) and dispersion curves (bottom) of a DC fiber from Philips.

FIG. 6 shows, at the top, the group delay time curves and, at the bottom, the dispersion curves of the Philips DC fiber with a single fiber length of 12.6 km and a double fiber length of 25.2 km with Schmidt mirror. The group delay time curves are not length-normalized, i.e. they are different; the dispersion curves, on the other hand, virtually agree.

The method according to the present invention may be advantageously applied particularly in the case of CD measurements with the phase-shift method, which method is employed in commercial devices. On the one hand, when working with that method, the synchronization of transmitter and receiver is awkward, while on the other hand, the great advantage of the phase-shift method—the high dynamic response—fits in very well with the measuring method according to the present invention, because of the double fiber length and, therefore, the double attenuation.

Figure 7:
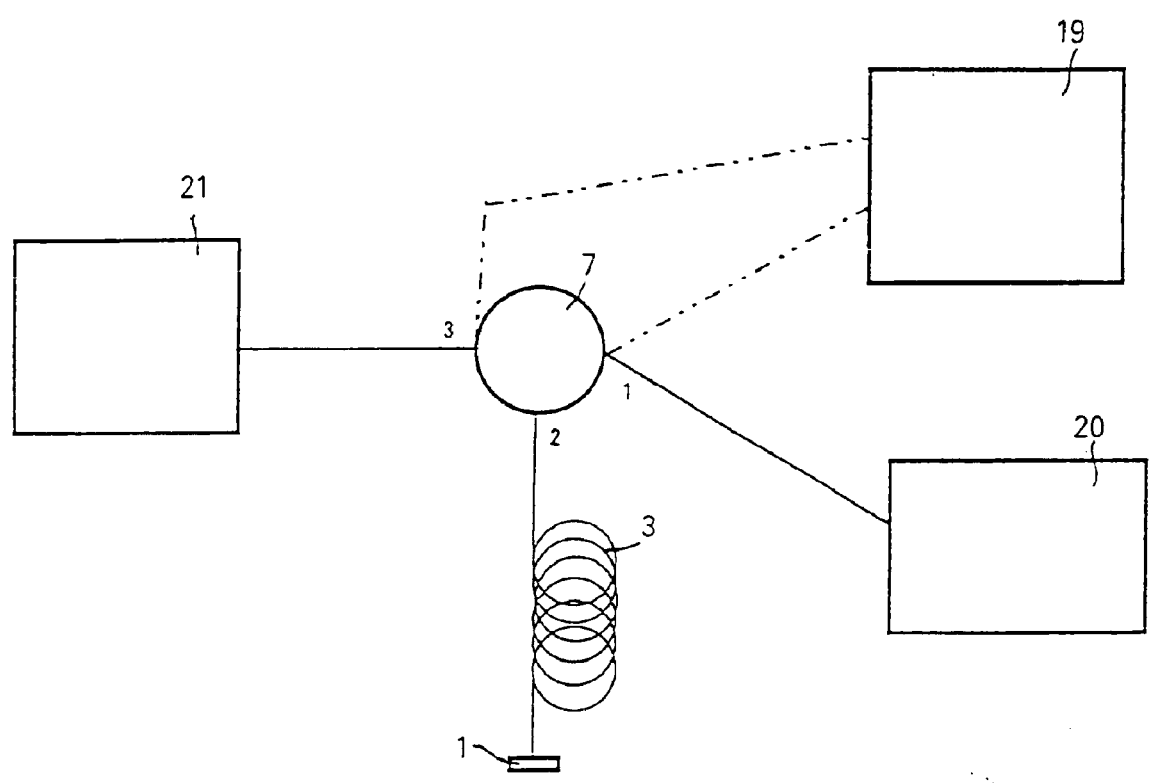
FIG. 7 shows a schematic diagram of a PMD measuring setup.

In the following, the measurement of the polarization mode dispersion (PMD) is described with reference to FIG. 7.

The measuring principle is the same as that of the measuring arrangements shown in FIGS. 4 and 5. In the case of measurements with a Michelson interferometer the linearly polarized radiation of LEDs 20 is supplied to port 1 of circulator 7, and in the case of measurements with polarimeter 19 the radiation of the tunable laser is supplied to port 1 of circulator 7, or alternatively to one leg of a Y-coupler (not shown). In turn, port 2 is connected to test fiber 3, and the power reflected by Schmidt mirror 1 is supplied to an analyzer of Michelson interferometer 21 or, alternatively, to a polarimeter 19. Thus, FIG. 7 shows the PMD measuring setup in the time domain (Michelson interferometer) and in the frequency domain (polarimeter) with Schmidt mirror I. The length dependence of the PMD must be taken into consideration in the evaluation of the measurement results. In the case of highly birefractive (HiBi) fibers, the PMD rises proportionally to the length L, whereas in the case of long standard fibers, it rises essentially with $L^{1/2}$. The highly birefractive fibers are examined first. For the time being, this case is of secondary interest for telecommunications systems, because long fibers of this kind are not yet used, so that the measurements can be carried out in the laboratory.

Figure 8:
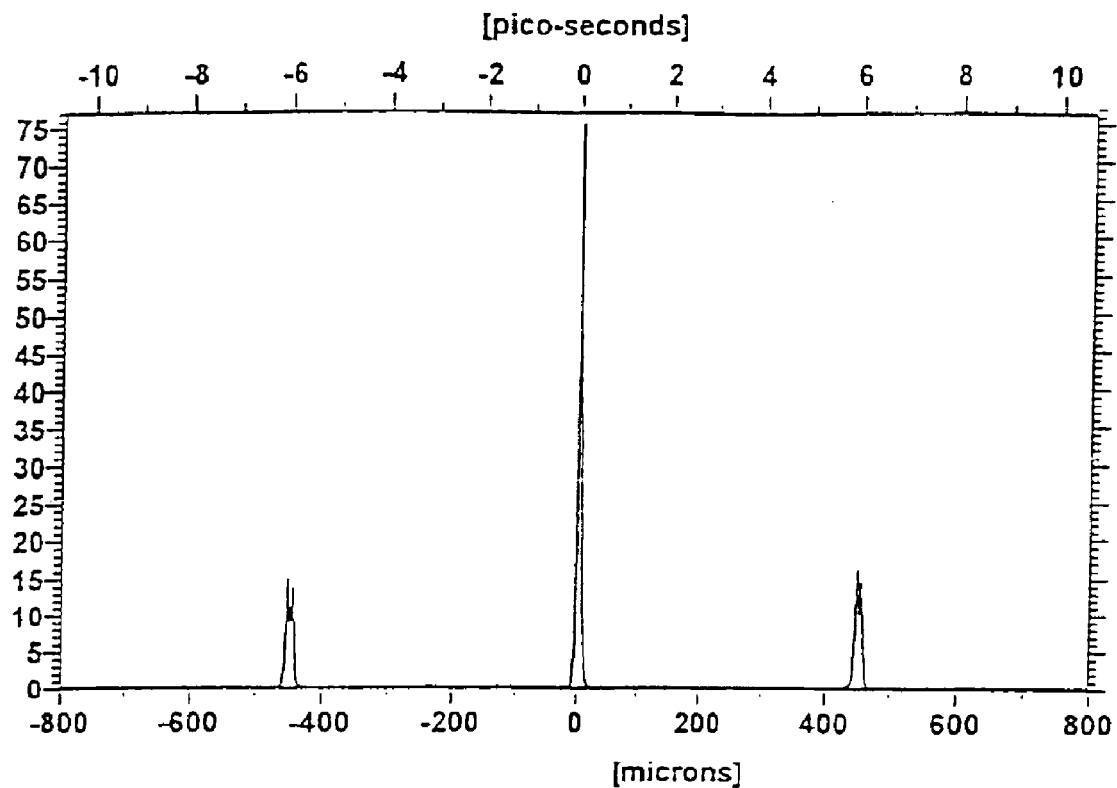
FIG. 8 shows an interferogram of an HiBi PANDA fiber.
Figure 8:
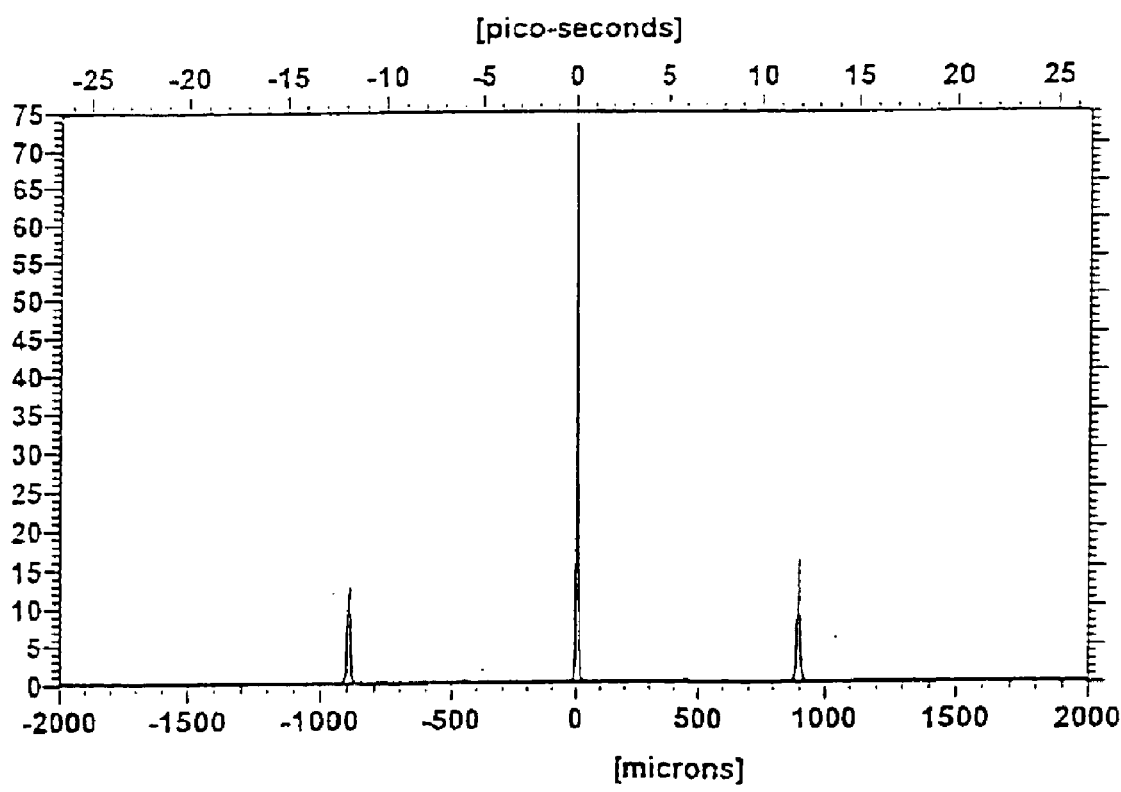

FIG. 8 shows a measuring example in which the PMD of a 4.37-meter-long highly birefractive PANDA fiber was measured, single and double length, at %=1546 nm. The two average values of the cursor distances from the autocorrelation peak are 5.99 ps and 11.98 ps, respectively, thus precisely double. The measuring accuracy of this interferometric method is exceptionally high.

On the other hand, PMD measurements using the method described here on standard fibers, primarily of installed cables, are of great interest. With regard to the PMD, standard SM fibers can be regarded as multimode fibers, this being of significance particularly as to the dependence on length. Analogous to the behavior of multimode fibers with respect to dispersion (pulse spreading), the PMD initially grows linearly with L, for L<h, when h is the coupling length; for L>h the PMD rises proportionally to $L^{1/2}$. Since h is of the order of magnitude of 10 m, i.e. h<<L, it can be assumed in good approximation that the PMD of fibers of installed cables is proportional to $L^{1/2}$. It can therefore be expected that the PMD value in the case of double fiber length, i.e. when using the Schmidt mirror, will be greater than the value of the single fiber length only by a factor of 1.41 ($2^{1/2}$). This has been tested and verified in experiments, as shown in Tables 2a and b. In discussing the measurement results in Tables 2a and b, it should be taken into account that both reproducibility and measuring accuracy are poor in the case of PMD measurements, based on the statistical character of the PMD. The measurements are performed both with Michelson interferometer 19 (in the time domain) and with polarimeter 20 (in the frequency domain). Polarimeter 20 permits PMD measurement with the Jones Matrix Method (JMM), with the Arc Angle Method (AAM) and with the Three Stokes Parameter Method (3StPM), which is also known among specialists as the Wavelength Scanning Method. Table 2a compiles the results from field measurements on the Deutsche Telekom service link Darmstadt-R ödermark (-Darmstadt) and Munich-Markt Schwaben (-Munich). The values are given in ps and the length of the cable Darmstadt-Rödermark (-Darmstadt) is L=22.45 km and that of the cable Munich-Markt Schwaben (-Munich) is L=30.25 km; with double length—use of the Schmidt mirror and a Y-coupler; measurements with the Michelson interferometer and the polarimeter (Jones Matrix Method (JMM) and Arc Angle Method (AAM)). Listed in the bottom line of each of the two tables is the value for the double length calculated from the single-length measurement. The double-length value is obtained by multiplication by the aforementioned factor 1.41. The comparison with the measured value of the double length permits a statement about the applicability of the measuring method according to the present invention. The agreement is very satisfactory within the framework of the general measuring accuracy, especially as the measurements were made on different days and at different times of year. It has already been mentioned that the reproducibility of the PMD measurements is not particularly good. Furthermore, it should be added that significantly lower PMD values are measured with the Arc Angle Method than with the two other polarimeter measuring methods. This results from the basic characteristic of the polarimeter. Table 2b gives measured PMD data in ps for two SM fibers on reels, the second fiber being terminated with obliquely polished connectors. The measurements were performed with the Michelson interferometer and the polarimeter (JMM, AMM, 3StPM). The double-length measurements were carried out with the Schmidt mirror and Y-coupler. In order to check whether problems arise due to Fresnel reflections at connectors, the second fiber was terminated with obliquely polished connectors for the measurements here. It can be deduced from the measurement data in the table that connector reflections play no role. In principle, attention must be paid to Fresnel reflections in measurements of this kind. They can be prevented simply by immersion oil between the connector end faces.

It is apparent from the tables that the measuring method described here is capable of delivering very satisfactory results in the case of measurements of SM fibers on reels, as well.

To summarize, it can be stated that the measuring method according to the present invention has significant advantages for the measurement of glass-fiber and plastic-fiber parameters, especially on installed cables. The measuring operations are made easier, considerable costs are saved, and some measurements on individual fibers are made possible for the first time. The additional connector with Schmidt mirror is a simple and low-cost component which can easily be manufactured in large quantities. At the receiver end, it is only necessary to connect the Schmidt mirror to the test fiber, an operation which can be performed by unskilled personnel. The proposed method can also be employed in principle for multimode fibers and, as already mentioned, for plastic fibers if, for example, broadband measurements are to be performed.

TABLE 1

|  | $\lambda_0$ in nm | $S(\lambda_0)$ in ps/km*nm$^2$ | $\sigma$ in ns/km | D(1300 nm) in ps/km*nm | D(1550 nm) in ps/km*nm |
|---|---|---|---|---|---|
| Single length 12.6 km | 1305.8 | 0.0883 | 0.0093 | −0.52 | 17.16 |
| Double length 25.2 km | 1306.8 | 0.0879 | 0.0114 | −0.60 | 17.17 |

L = 12.6 km

|  | $\lambda_0$ in nm | $S(\lambda_0)$ in ps/km*nm$^2$ | $\sigma$ in ns/km | D(1300 nm) in ps/km*nm | D(1550 nm) in ps/km*nm |
|---|---|---|---|---|---|
| Single length 5.2 km | 1524.3 | 0.0533 | 0.0150 | −15.0 | +1.34 |
| Double length 10.4 km | 1525.2 | 0.0545 | 0.0277 | −14.8 | +1.32 |
| Single length TEC-Laser | 1527.1 | 0.0556 | — | — | — |

L = 5.2 km

TABLE 2a

|  | Da-Rö-Da Fiber No. 30 Interferom. λ = 1321 nm | Da-Rö-Da Fiber No. 37 Interferom. λ = 1321 nm | Da-Rö-Da Fiber No. 30 Interferom. λ = 1546 nm | Da-Rö-Da Fiber No. 37 Interferom. λ = 1546 nm | M-MS-M Fiber No. 14 Interferom. λ = 1321 nm | M-MS-M Fiber No. 14 Polarimeter JMM, 1550 nm | M-MS-M Fiber No. 14 Polarimeter AAM, 1550 nm |
|---|---|---|---|---|---|---|---|
| Single fiber length | 8.7 | 6.0 | 6.2 | 5.5 | 1.75 | 1.75 | 1.25 |
| Double fiber length | 11.5 | 8.2 | 10.6 | 8.7 | 3.35 | 3.35 | 2.15 |
| Calculated value (*$2^{1/2}$) | 12.3 | 8.4 | 8.8 | 7.8 | 2.5 | 2.5 | 1.8 |

TABLE 2b

| Measured fiber | Fiberware-Fiber No. 1 L = 23.13 km | Fiberware-Fiber No. 3 L = 23.13 km | Fiberware-Fiber No. 3 L = 23.13 km | SM-fiber with obliquely polished connector L = 24 km | SM-fiber with obliquely polished connector L = 24 km | SM-fiber with obliquely polished connector L = 24 km |
|---|---|---|---|---|---|---|
| Measuring method | Interferom. λ = 1321 nm | Interferometer λ = 1321 nm | Polarimeter λ = 1315 nm | Interferometer λ = 1321 nm | Polarimeter λ = 1315 nm | Polarimeter λ = 1550 nm |
| Single fiber length | 0.27 | 0.28 | 0.17 (JMM) 0.15 (AAM) | 0.27 | 0.26 (AAM) 0.37 (3StPM) | 0.40 (JMM) 0.23 (AAM) |

TABLE 2b-continued

| Measured fiber | Fiberware-Fiber No. 1 L = 23.13 km | Fiberware-Fiber No. 3 L = 23.13 km | Fiberware-Fiber No. 3 L = 23.13 km | SM-fiber with obliquely polished connector L = 24 km | SM-fiber with obliquely polished connector L = 24 km | SM-fiber with obliquely polished connector L = 24 km |
|---|---|---|---|---|---|---|
| Double fiber length | 0.35 (Y-coupler) 0.37 (circulator) | 0.36 | 0.24 (JMM) 0.19 (AAM) | 0.43 | 0.44 (AAM) 0.59 (3StPM) | 0.52 (JMM) 0.49 (AAM) |
| Calculated value ($*2^{1/2}$) | 0.38 | 0.40 | 0.24 (JMM) 0.21 (AAM) | 0.38 | 0.37 (AAM) 0.52 (3StPM) | 0.57 (JMM) 0.33 (AAM) |

What is claimed is:

1. A method for measuring at least one parameter of an individual fiber of a fiber cable, the method comprising:

reflecting measuring radiation at the end of a test fiber to a fiber input using a mirror having at least 99% reflectivity;

measuring the at least one parameter using a combined transmitting and receiving station disposed at the fiber input;

driving and modulating a laser using a pulse generator, the laser being disposed at a field measuring station;

conducting a signal corresponding to approximately 10% of a light beam to a first input of an oscillograph using a Y-coupler;

inputting a signal corresponding to approximately 90% of the light beam to a first port of a circulator, a second port of the circulator being connected to the test fiber, the end of the test fiber being connected to the mirror;

inputting the reflected measuring radiation to a detector via a third port of the circulator; inputting an output signal of the detector to a second input of the oscillograph;

delaying a trigger pulse of the oscillograph using a variable electric delay line so that a measuring pulse appears stable on a monitor of the oscillograph;

measuring a position of a peak of the measuring pulse; and using the measured position as a measured value.

2. The method of claim 1 wherein the individual fiber is a single-mode glass fiber and wherein the at least one parameter is at least one of a chromatic dispersion and a polarization mode dispersion.

3. The method of claim 1 wherein the individual fiber is a multimode glass fiber and wherein the at least one parameter is a bandwidth.

4. The method of claim 1 wherein the individual fiber is a multimode plastic fiber and wherein the at least one parameter is a bandwidth.

5. The method of claim 1 wherein the mirror includes a Schmidt mirror.

6. The method of claim 5 wherein the individual fiber is a glass-fiber including a spectral bandwidth of between 1250 nm and 1620 nm.

7. The method of claim 5 wherein the individual fiber is a plastic-fiber including a spectral bandwidth of between 650 nm and 950 nm.

8. The method of claim 1 wherein the mirror includes a highly reflective mirror coating disposed on an end face of a fiber connector, the fiber connector being connected to the test fiber.

9. The method of claim 1 wherein the mirror includes a highly reflective mirror coating disposed on an end face of a first fiber connector of a short fiber cable element, the fiber cable element including a standard connector for connection to the test fiber.

10. The method of claim 9 wherein the Y-coupler is a spectrally broadband Y-coupler useable in a first and a second optical windows.

11. The method of claim 10 wherein the first optical window is approximately 1300 nm and the second optical windows is approximately 1550 nm.

12. The method of claim 1 wherein the measuring includes high-precision attenuation measuring with a cut-back technique and wherein the fiber cable is an installed glass-fiber cable.

13. The method of claim 1 wherein the measuring includes high-precision attenuation measuring with a cut-back technique and wherein the fiber cable is an installed plastic-fiber cable.

14. The method of claim 1 wherein the measuring includes laboratory measuring and wherein the individual fiber includes first and second ends disposed in different respective rooms.

\* \* \* \* \*